(12) United States Patent
Werner et al.

(10) Patent No.: US 7,961,635 B2
(45) Date of Patent: Jun. 14, 2011

(54) NETWORK LATENCY ANALYSIS PACKET AND METHOD

(75) Inventors: Carl E. Werner, Holmdel, NJ (US); Frank Rauscher, New Tripoli, PA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1421 days.

(21) Appl. No.: 11/439,851

(22) Filed: May 24, 2006

(65) Prior Publication Data
US 2007/0274227 A1 Nov. 29, 2007

(51) Int. Cl.
*H04L 12/26* (2006.01)
(52) U.S. Cl. ............... 370/248; 370/252; 370/353
(58) Field of Classification Search ........... 370/231, 370/242, 248, 252, 351–353, 389, 458
See application file for complete search history.

(56) References Cited

U.S. PATENT DOCUMENTS

| | | | |
|---|---|---|---|
| 5,793,976 A * | 8/1998 | Chen et al. ............ | 370/252 |
| 6,058,102 A * | 5/2000 | Drysdale et al. ....... | 370/252 |
| 6,269,079 B1 * | 7/2001 | Marin et al. ........... | 370/230 |
| 6,363,053 B1 * | 3/2002 | Schuster et al. ....... | 370/230 |
| 6,545,979 B1 * | 4/2003 | Poulin .................. | 370/241.1 |
| 6,587,438 B1 | 7/2003 | Brendel | |
| 7,619,982 B2 * | 11/2009 | Blair et al. ............ | 370/248 |
| 2001/0013067 A1 * | 8/2001 | Koyanagi et al. ...... | 709/230 |
| 2003/0048754 A1 * | 3/2003 | Bruckman ............. | 370/252 |
| 2003/0219014 A1 * | 11/2003 | Kotabe et al. ......... | 370/375 |
| 2004/0088430 A1 * | 5/2004 | Busi et al. ............. | 709/238 |
| 2005/0089016 A1 * | 4/2005 | Zhang et al. ........... | 370/351 |
| 2005/0091482 A1 * | 4/2005 | Gray et al. ............. | 713/151 |
| 2006/0092850 A1 * | 5/2006 | Neidhardt et al. ...... | 370/252 |
| 2006/0104218 A1 * | 5/2006 | Kako .................... | 370/252 |
| 2006/0215574 A1 * | 9/2006 | Padmanabhan et al. | 370/252 |
| 2007/0064618 A1 * | 3/2007 | Garcia et al. .......... | 370/252 |
| 2008/0225713 A1 * | 9/2008 | Tychon et al. ......... | 370/231 |

FOREIGN PATENT DOCUMENTS

EP    0 993 146    1/2000

OTHER PUBLICATIONS

International Search Report PCT/US2007/069412 dated Nov. 12, 2007.
Robert E. Kahn, Steven A. Gronemeyer, Jerry Burchfiel and Ronald C. Kunzelman, Advances in Packet Radio Technology, Invited Paper, Proceedings of the IEEE, vol. 66, No. 11, Nov. 1978, United States of America.

* cited by examiner

*Primary Examiner* — Ricky Ngo
*Assistant Examiner* — Phuongchau B Nguyen
(74) *Attorney, Agent, or Firm* — Hope Baldauff Hartman, LLC

(57) ABSTRACT

A packet and a method for analyzing network latency are disclosed. The disclosed systems and methods measure the latency between nodes in a network and do so while using less bandwidth and processing than traditional methods by using a packet to traverse a network and collect timestamps at various nodes so that the delay in transit time between nodes can be calculated when the packet returns to a server.

10 Claims, 8 Drawing Sheets

NETWORK LATENCY ANALYSIS PACKET AND METHOD

FIELD OF THE INVENTION

The present invention relates to the measurement of network latency in a packet switched network. More particularly, the invention provides packets and methods for traversing a network to calculate network latency.

BACKGROUND OF THE INVENTION

The time that it takes for a packet of data to travel between nodes in a packet switched network may be used to evaluate the health of a network. Each packet of data may take various routes through different nodes (such as routers or switches) to go from one endpoint to another. The route that is taken by one packet of data may be different than the route taken by another packet of data even if the two packets have the same origin and destination. This is done in order to optimize the use of bandwidth available in the network, minimize the transmission latency, and to increase the robustness of communication.

Network providers offer Layer 3 network services, more commonly referred to as Virtual Private Network services, and in doing so guarantee certain maximum delay times for each class of service that is being provided. For example, delay sensitive applications such as voice over IP may require the highest class of service (with the quickest guaranteed delivery time), such as class of service 1. Conversely, an application like email is often less sensitive to delay, and thus might be placed in one various lower class of service having longer guaranteed delivery times (e.g., class of service 4).

In order to monitor whether the services provided are meeting appropriate requirements, a provider usually ascertains the time it takes for a packet to travel between nodes for each class of service. For example, if a provider guarantees a 125 millisecond maximum latency for class of service 1, then the provider must be able to monitor and show that class of service 1 packets take no longer than 125 milliseconds to be delivered between endpoints. Currently, network latency is generally measured by sending a packet from one spoke node to a hub node and back to the spoke node again, and measuring the time it takes for the packet to make the round trip. Each node then stores the information in a database known as the Management Information Base ("MIB") or other memory of the node. Typically, a non-hub node sends a packet, receives it back and stores the delay time in its MIB. Because each node is storing the delay between itself and other nodes, in order to aggregate the data from a group of nodes in a network, a server needs to query each of the nodes. This combined effort of querying multiple nodes in a network requires a significant amount of bandwidth, memory for MIB data storage, and processing time. Therefore, it would be helpful to have a method of measuring delay between nodes that would require less bandwidth and processing time than the amount required by sending a packet round trip between each spoke node and a hub node and subsequently querying the resulting delay information from each node in the network.

SUMMARY OF THE INVENTION

At least some embodiments provide packets and/or methods for measuring network latency, potentially offering a more efficient method of measurement by comparison to existing methods. In at least some embodiments, for example, the bandwidth and processing required to assess packet transmission times can be significantly reduced. At least some embodiments further provide for monitoring the general health of a network.

In at least some embodiments, a management crossover server sends a latency-analysis packet to multiple nodes in a network along a predetermined path. While traversing that predetermined path, the packet receives timestamps at multiple nodes, with the timestamps reflecting arrival times at those nodes. Each node in the network may be any type of communications device, including a router or switch. When the path has been completed, the packet returns to the management crossover server, the source of the latency-analysis packet, where the latency between two or more nodes in the traversed path can be measured. In some embodiments, the management crossover server can then parse the information in the packet and calculate delays between two nodes by subtracting a first timestamp from a second timestamp. Once the data in the packet has been parsed and transfer delays calculated, associated Service Level Agreement ("SLA") graph points may be generated. The SLA graphs may indicate whether or not a network provider is meeting its requirements for network delay.

In at least some variations, each node may enter a first timestamp into the packet when the node receives the packet and enter a second timestamp into the packet when the packet is leaving the node. In other variations, the management crossover server also determines the overall health of the network by calculating the entire time it takes to traverse the specified path through the network and return to the management crossover server. In some embodiments, other traffic statistics can be derived from delay measurements such as jitter, which is the variance from the expected arrival time, the derived mean delay, or delay as a function of time.

Some embodiments can be partially or wholly implemented on a computer-readable medium, for example, by storing computer-executable instructions or modules, or by utilizing computer-readable data structures.

BRIEF DESCRIPTION OF THE DRAWINGS

In the following description of various embodiments, reference is made to the accompanying drawings that form a part hereof, and in which is shown by way of illustration various embodiments in which the invention may be practiced. These embodiments are provided as examples but they do not limit the invention to these particular embodiments. It is to be understood that other embodiments may be utilized and modifications may be made without departing from the scope of the present invention.

DETAILED DESCRIPTION OF THE INVENTION

In at least some embodiments, delay between two or more nodes in a network can be determined. The network may be a local area network (LAN), wide area network (WAN), such as the Internet, or any other type of network connecting a plurality of computer devices. In some embodiments, delay is measured by sending at least one packet to various nodes in the network and returning to a point that may be outside the network to analyze the data in the at least one packet. In some embodiments, each node is identified by an IP address.

Figure 1:
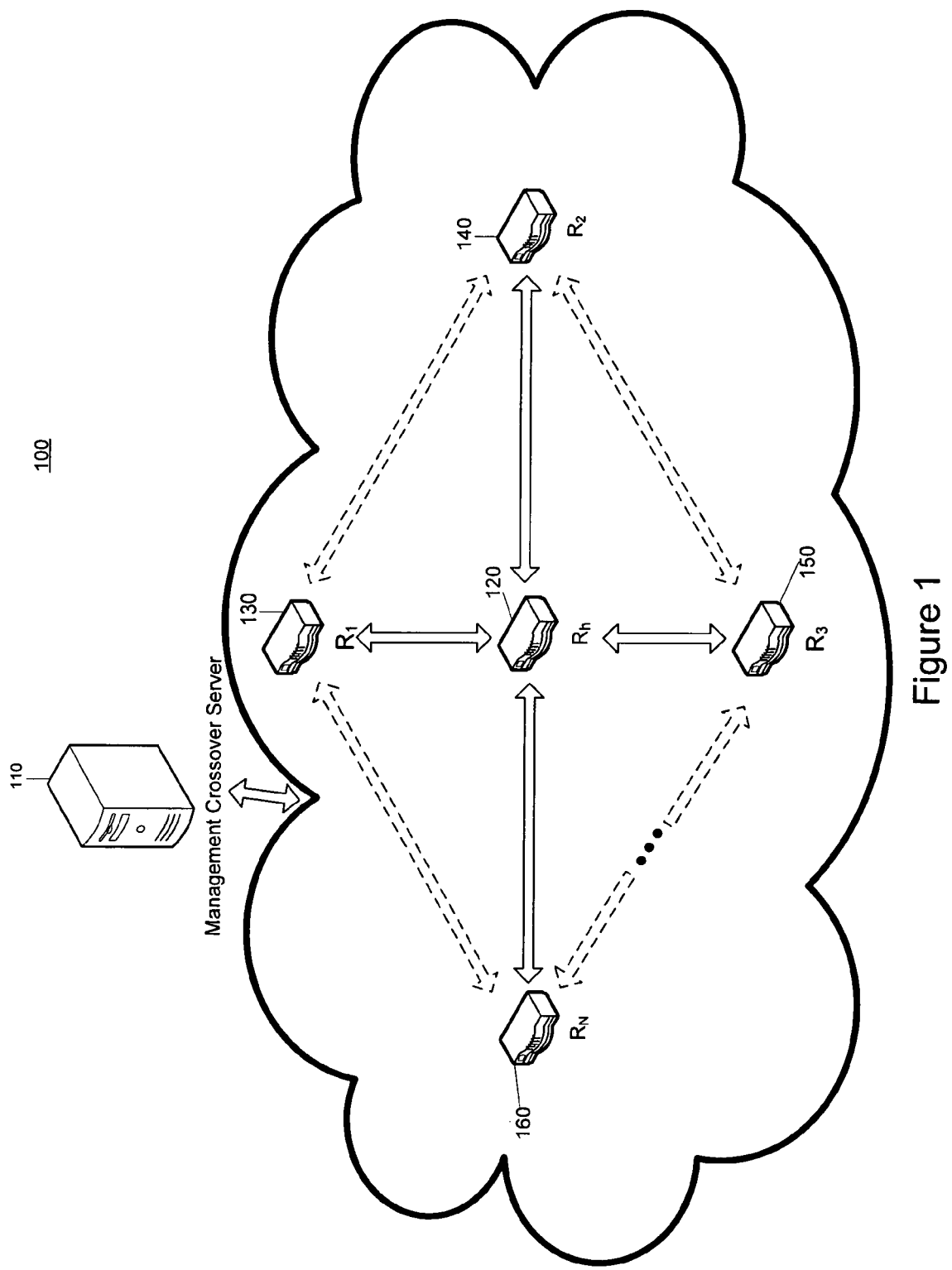
FIG. 1 shows an exemplary network in which at least some exemplary embodiments may be implemented.

FIG. 1 illustrates one possible network configuration (100) having a spoke/hub network setup depicted by way of example. The following discussion of several embodiments should not be deemed limited to the depicted spoke/hub network configuration of FIG. 1 but rather encompasses other network configurations well known in the art. In the network configuration 100, spoke nodes $R_1$ (130), $R_2$ (140), $R_3$ (150) and $R_N$ (160) (where N represents an arbitrary whole number) can each communicate with a hub node, $R_h$ (120), across a network. The spoke nodes 130, 140, 150 and 160 may also be able to communicate with each other. In at least some embodiments, the spoke node 130 may communicate with the spoke node 140 by sending a request across the network, traversing through the hub node 120 (see arrows with solid line borders). In an alternate embodiment, the spoke node 130 may also be able to communicate directly with the spoke node 140 (see arrows with broken line borders).

Figure 2:
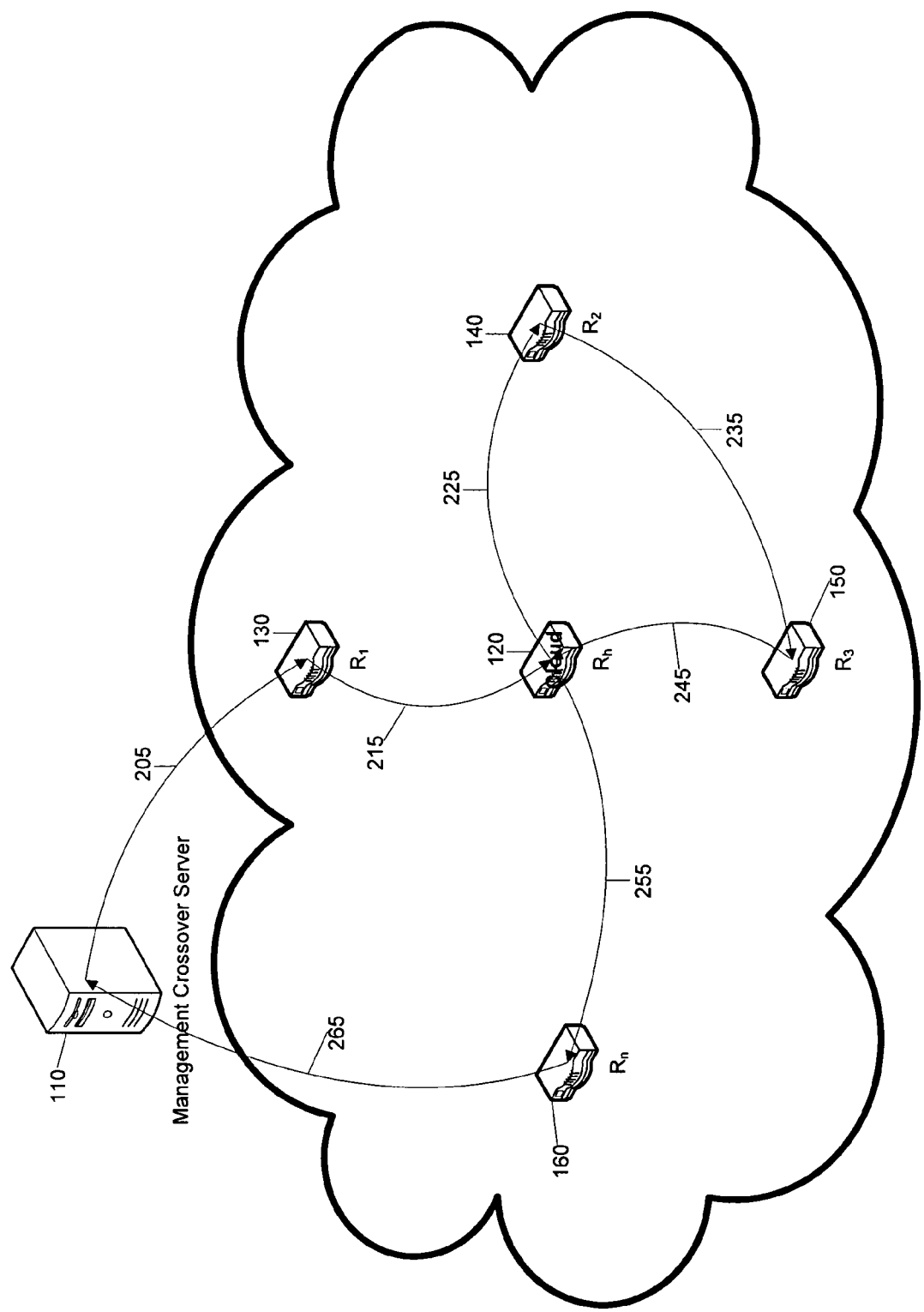
FIG. 2 shows the operation of at least some embodiments in an exemplary network.

FIG. 2 illustrates one possible route that a packet may take to measure delay times in a network. In the example of FIG. 2, a packet travels from a management crossover server 110 to a first spoke node 130 (identified in FIG. 3 by an IP address) through a first network connection 205. The first spoke node then marks the packet with a first timestamp at the time that the packet arrives at the first spoke node. The packet is then forwarded to the next node listed in the route specified for the packet and arrives at a hub node 120 via a second network connection 215. This process is repeated for every node in a sequence of nodes contained within the packet. This sequence lists the nodes to be traversed, going from hub node 120 to a third spoke node 140 via a third network connection 225, continuing on to a fourth spoke node 150 via a fourth network connection 150, returning to the hub node 120 via a fifth network connection 245. This process is repeated until an Nth node 160 is reached via a network connection 255. In at least some embodiments, the number of nodes visited by a packet can be determined by the size of the packet and/or by the list of nodes to be traversed. In some embodiments, a packet may visit one or more nodes multiple times. In one embodiment, the packet then returns to the management crossover server 110 from the Nth node 160 via a network connection 265.

In some embodiments, the latency analysis packet may not specify the route to be traversed. In such an embodiment, the packet may specify the number of nodes to be visited. In other embodiments, the packet may indicate that the packet should continue to visit nodes until there is no room left in the packet's memory to store the relevant information. In such an embodiment, the latency analysis packet may be sent toward a destination but returns to a management server when it has no more room for data. The amount of memory needed can vary depending upon the information that a packet is collecting. For example, the packet will at a minimum need memory to store a node identifier and a timestamp for each node visited. However, per node visited, the packet may be collecting only one timestamp, multiple timestamps (e.g. one timestamp entered when the packet is received by the node and one timestamp entered when the packet is leaving the node), or other data in addition to the node identifier and timestamp as well. In some embodiments where the route traversed is not predetermined by the packet, each node visited can determine which node is the next to be visited. In other embodiments, each node may determine a subpath for the node to traverse. For example, when a packet visits node A, node A can provide the information that the packet is collecting and if the packet does not have a predetermined next node to visit, node A may select node B as the next node to visit. Alternatively, node A may select a set of nodes for the packet to visit—i.e. node A may enter node identifiers for nodes C, D, and E. In still other embodiments, a packet may identify at least one node to visit and allow the network to determine the route that will be taken to get to that node. For example, a packet may identify that it should visit node M, but it does not specify a specific network path to reach node M. In such an embodiment, the packet may first come to node A. In addition to entering the relevant information into the packet, node A could then identify a full path of nodes in order for the packet to reach node M. Alternatively, node A could identify one node to visit that requires fewer hops to reach node M (i.e. fewer intermediate nodes between node B and node M) than node A requires. In an embodiment where a first latency packet is sent toward an ultimate destination and traverses a plurality of nodes without direction as to the next node to visit, the packet returns to the source and an empty packet is sent back to the last node visited to continue on its path toward its ultimate destination collecting data as it travels. Furthermore, in some embodiments, the packet is of fixed length, while in other embodiments, the packet can be of variable length. In some embodiments, packets of variable length may contain fixed node data—for example, a packet may be of variable length so that a non-predetermined number of nodes may be visited, but may still contain certain data regarding the packet such as the class of service of the packet.

Figure 3:
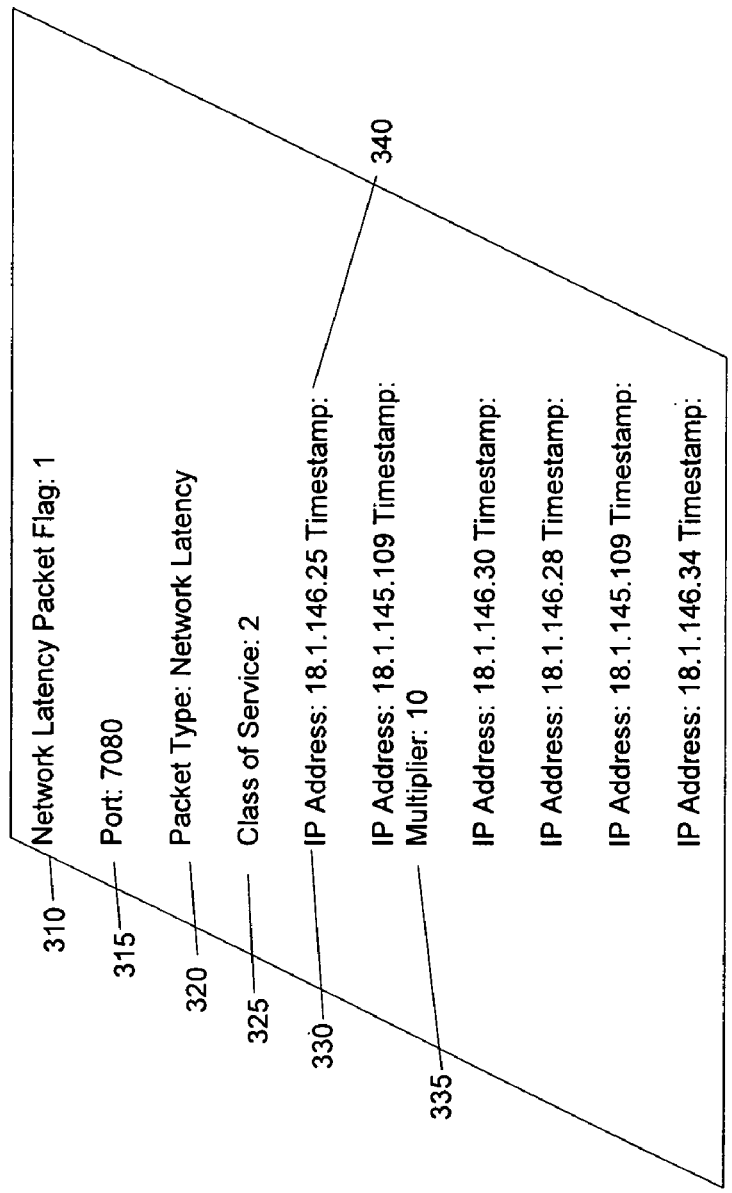
FIG. 3 shows a packet that may be sent, according to at least some exemplary embodiments, through a network from a management crossover server.

FIG. 3 illustrates a latency analysis packet 300 before it has traversed a network. In one embodiment, the packet comprises a listing of the IP addresses of each node in the network that the packet will traverse. For example, the packet contains data including an IP address of a first node to be traversed is 18.1.146.25 (330) and space for a timestamp to be stored 340. In this way, the packet will travel to each of the listed nodes in the network in order to collect a timestamp indicating when the packet was received by each node. In some embodiments, the timestamp will include a date. In other embodiments, the timestamp may be similar to a Unix clock timestamp, indicating time elapsed since a certain date and time. In still other embodiments, the IP addresses in the packet may provide for the packet to go back and forth between two nodes, with either the same class of service or different classes of service as further explained with respect to FIG. 4 below.

In other embodiments, the packet may include a multiplier field 335 that indicates the number of times a packet should traverse a path. The multiplier field 335 may indicate the number of times to go back and forth between the current node and another (the previous or next) node. In some embodiments, the Multiplier field may be decremented each time the packet is received at that node.

Figure 4:
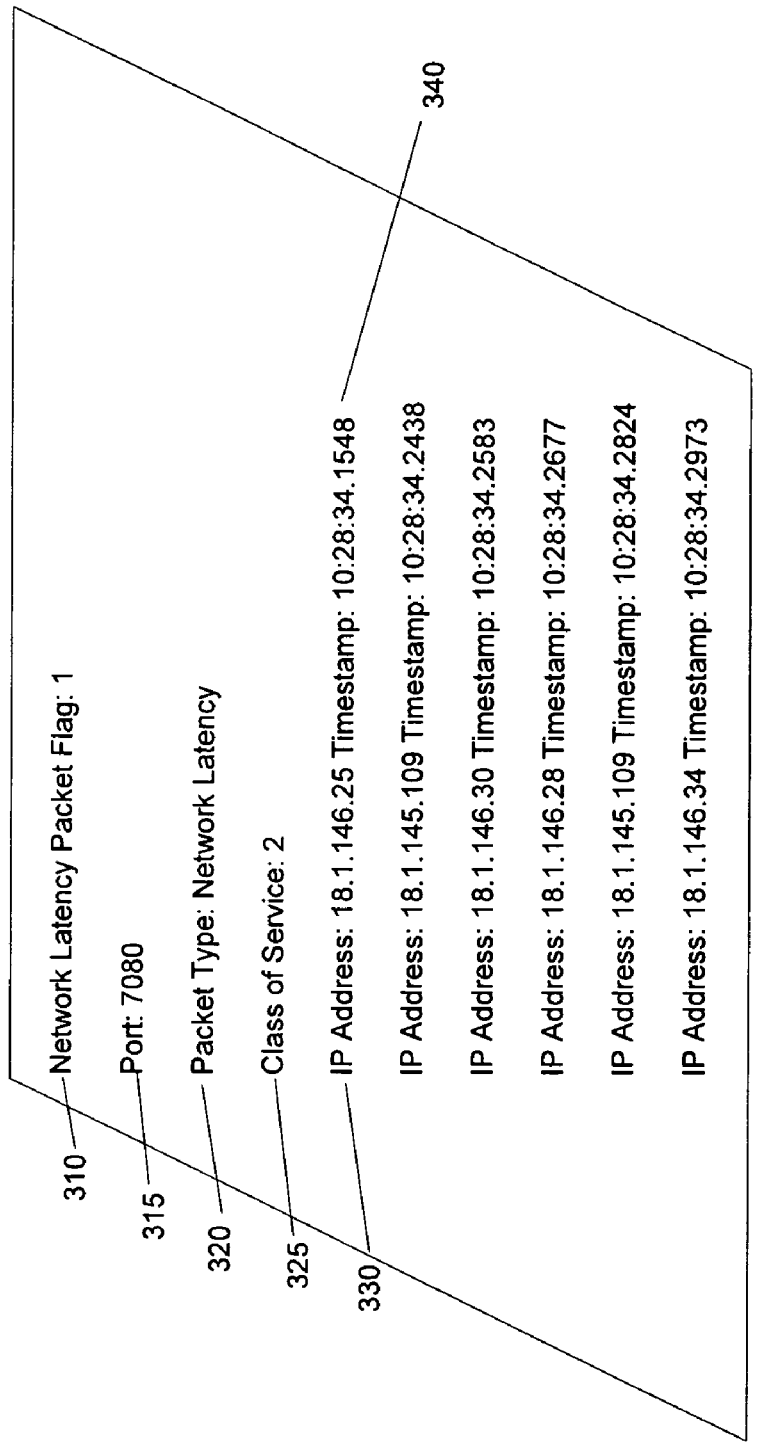
FIG. 4 shows an exemplary packet after having traversed a network and returned to a management crossover server.

FIG. 4 illustrates a packet 300 after it has traversed a network. The packet 300 is the same as the packet 300 of FIG. 3, except that additional data has been added after the packet has traversed the network and returned to the source server. Specifically, the packet 300 has a timestamp for each node that was visited in the network. In one embodiment, the packet 300 may be implemented using existing IP protocols. In another embodiment, the packet may be implemented using other protocols or a new protocol. In other embodiments, the packet 300 may comprise a flag 310, a specific port number 315, or some other field 320 to indicate that the packet is an administrative packet that is being used to test the delay in the network. In some embodiments, a class of service 325 for the packet is identified. In other embodiments, a class of service may be identified for each pair of endpoints—for example, if the route for a packet includes traveling from router A to router B, back to router A, then to C, there could be a class of service identified for each of the three paths traveled.

As also seen in the packet 300 of FIG. 4, it is possible to subtract the timestamps from two nodes in order to determine the time it took for the packet to travel from one node to the next. In a similar fashion, it is possible to subtract the final timestamp from the first timestamp in order to obtain the time it took to travel through the route specified in the packet, indicating the general health of the network traversed.

In other embodiments, each node may enter more than one timestamp in the packet. A first timestamp may be the entered when the node receives the packet. A second timestamp may be entered when the packet is leaving the node. This may provide for the ability to determine whether delays in the network are due to transit time between nodes or processing times at a node. Some embodiments allow other metrics to be derived for the network based on the delay measurements, such as jitter, which is the variance from the expected arrival time, the derived mean delay, or delay as a function of time.

In still other embodiments, a packet may not specify which specific nodes in a network are to be traversed. The packet may be sent to any node or to any of a set of nodes specified. The packet would then have a timestamp and a node identifier (e.g. an IP address) entered for each node visited and would eventually return to the management crossover server. The packet may provide a method for determining when to return. For example, the packet could contain a value for a predetermined number of nodes that must be traversed. When the packet arrives at a node, the node examines how many nodes have already been traversed (e.g., a counter within the packet which is decremented by each node the packet traverses). If the packet has traversed the predetermined number of nodes, the current node returns the packet to the management crossover server based on a loopback address for that server within the packet. If the packet has not traversed the required number of nodes, the current node then selects another node to which the packet should be sent. This determination could be random, could be based on class of service being measured by the packet, or determined in various other ways. A packet could also be designed to return to the management crossover server based on elapsed time instead of the number of nodes traversed.

Figure 5:
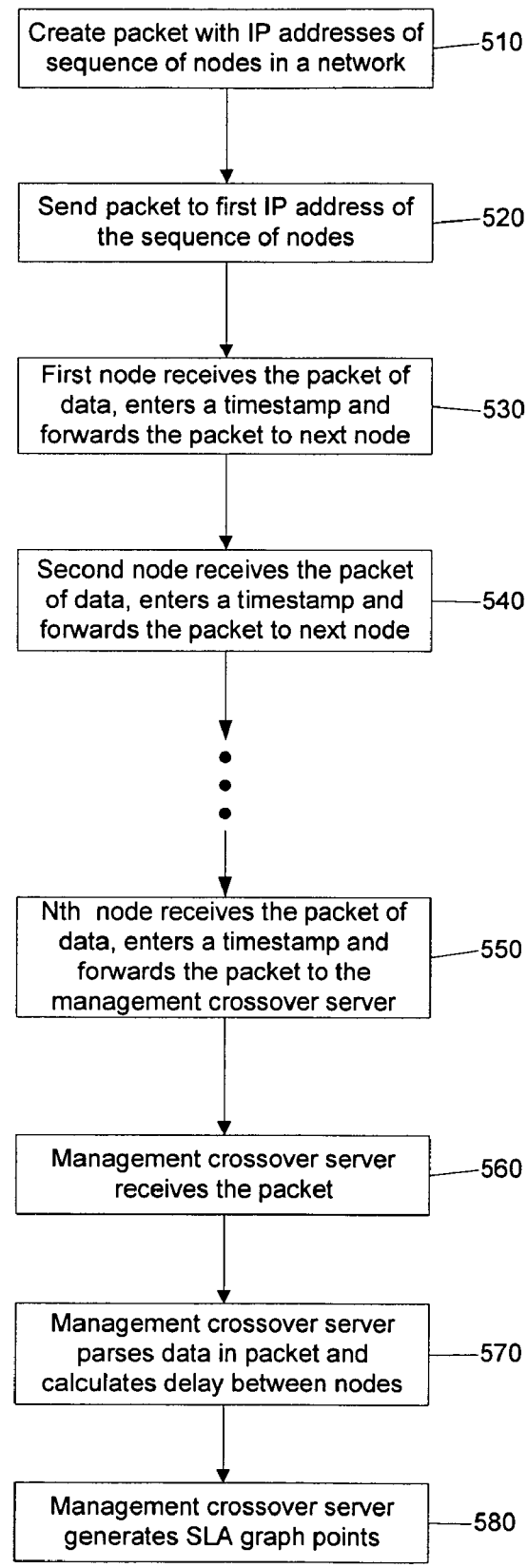
FIG. 5 is a flowchart of a process, according to at least some embodiments.

FIG. 5 is a flowchart for a process according to at least one embodiment. In that embodiment, a packet with a list of node identifiers identifying a sequence of nodes to be traversed is created in step 510. Next the packet is sent to the first node in the sequence of nodes in step 520. When the first node receives the packet at step 530, a timestamp is entered in the packet and is associated with the first node. The first node then forwards the packet to the next node in a sequence of nodes contained within the packet. In step 540, the packet is received by the next node in the sequence of nodes. The second node then places a timestamp in the packet so as to be associated with the second node. The second node then forwards the packet to the third node. This continues through 0, 1 or more nodes (shown in FIG. 5 as a vertical ellipsis between blocks 540 and 550) until the last, or Nth, node in the sequence is reached in step 550. In that step, the Nth node receives the packet, enters a timestamp to be associated with the Nth node, and forwards the packet to the management crossover server. In step 560, the management crossover server receives the packet of data. In step 570, the management crossover server parses the information in the packet and calculates delays between nodes by subtracting the timestamp of the first of a pair of nodes from the timestamp of the second of that pair of nodes. In step 580, after the data in the packet has been parsed and transfer delays calculated, associated SLA graph points may be generated. In some embodiments, the delay points are plotted on a real-time graph so that a dynamic reading of the delay is possible. In some embodiments, latency measurements are averaged in order to generate graph points. The SLA graphs indicate whether or not a network provider is meeting its requirements for network delay.

In some embodiments, there may be multiple packets that are sent through the network, either along the same route or along different routes. Each packet sent through the network may have a different class of service assigned to it. This would allow for a separate measurement of the delay for each of the classes of service available in a network. Multiple routes may also be used for measurements corresponding to the same class of service. For example, a packet length may limit the amount of data (e.g., node identifiers and timestamps) that may be stored, thus limiting the number of nodes that may be visited by the packet. Accordingly, one packet may be sent to a first collection of nodes within the network, another packet sent to a different collection of nodes, etc. The nodes traversed by these multiple packets may be completely distinct (i.e., no node pairs common between the lists of nodes in the multiple packets), or there may be some nodes traversed in common to more than one packet.

Figure 6:
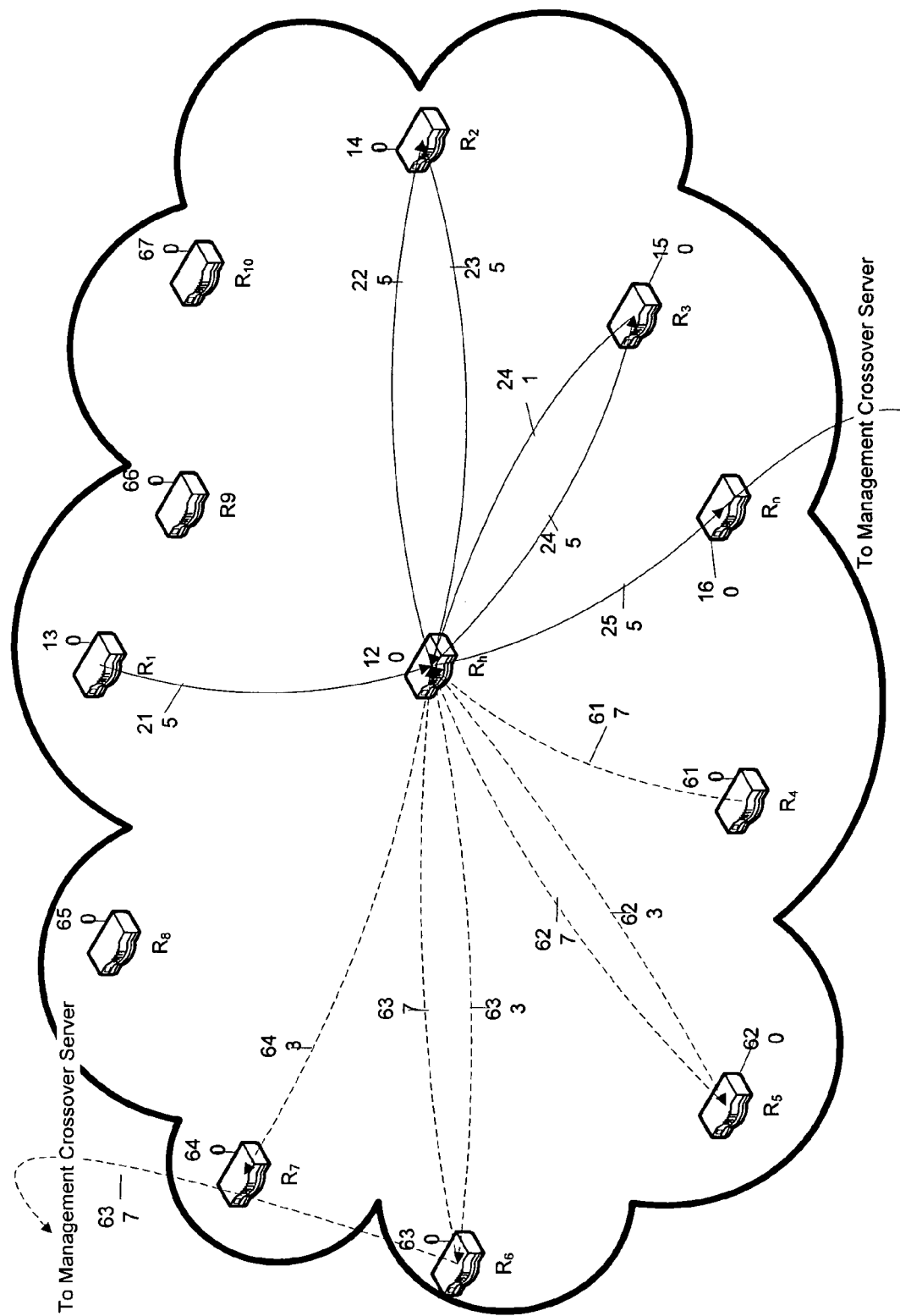
FIG. 6 shows operation, according to at least some embodiments, where at least two packets are being sent along different routes in a network.

FIG. 6 illustrates the routes that two different packets traversing the same network may make, visiting different sets of nodes. In such an embodiment, a first packet would traverse the network visiting a first group of nodes, the nodes and route previously identified in FIG. 2 (see the solid lines in FIG. 6). A second packet could traverse the network visiting a second group of nodes (see the dotted lines in FIG. 6). As can be seen from FIG. 6, once the packet arrives at a spoke node 610, the spoke node 610 could enter a timestamp into the packet, check which node is the next node in the sequence and forward the packet along to the hub node 120 along network connection 617. Next, the hub node 120 would receive the packet, mark the packet with a timestamp and forward the packet along to a spoke node 620 along network connection 623. This process would be repeated with the spoke node 620 receiving the packet, marking the packet with a timestamp and forwarding the packet to the hub node 120 along network connection 627. The hub node 120 would then receive the packet, mark the packet with a timestamp and forward the packet along to a spoke node 630 along network connection 633. The spoke node 630 would receive the packet, mark the packet with a timestamp and forward the packet to the management crossover server along network connection 637. The other nodes 640, 650, 660, and 670 are nodes that could be traversed in a route of a third packet.

Figure 7:
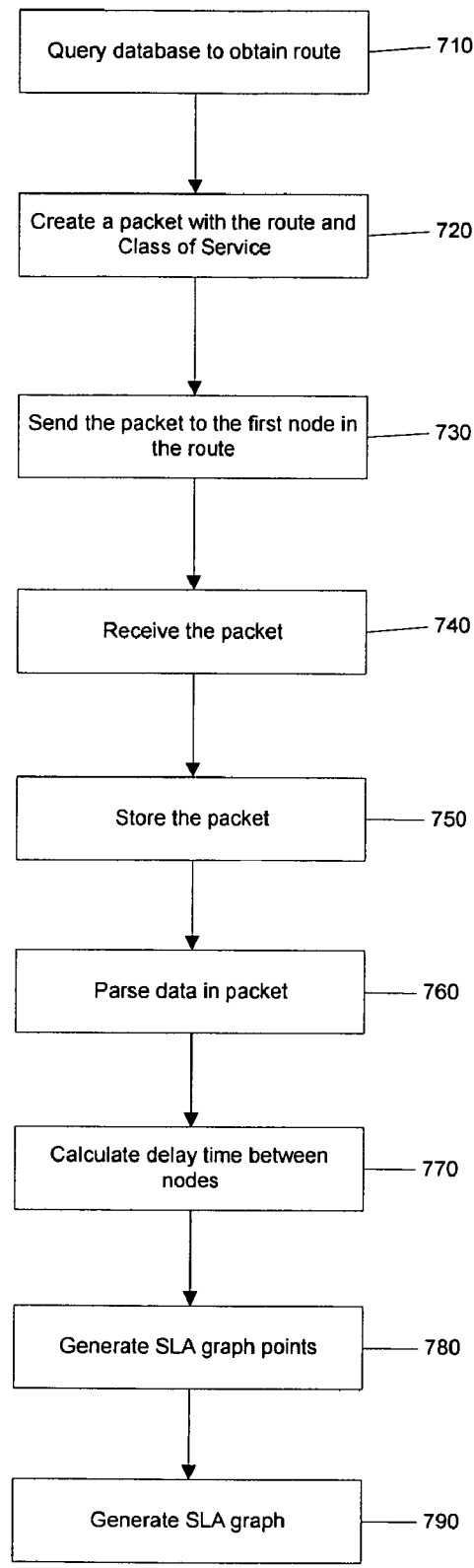
FIG. 7 is a flowchart of a process, according to at least some embodiments, performable at a server.

FIG. 7 shows a flowchart illustrating a process that a server may execute in at least one embodiment. In the embodiment shown in FIG. 7, a server queries a database or other storage medium in step 710 to ascertain which nodes in a network for each class of service should be tested by the current packet for network latency based on the data needed to create a SLA graph. In some embodiments, all nodal paths will be included in the latency measurements of a packet. In other embodiments, only some nodal paths will be included in the latency measurements of a packet. In variations of some embodiments, multiple packets are used to measure the latency of all nodal paths. Next, a packet is created with a class of service and the node identifier of each node that is to be visited and room for the timestamp data to be entered in step 720. In step 730, the packet is sent to the first node in the route identified and the packet traverses the network in the order specified in the packet. Eventually, the packet returns to the source server and the source server receives the packet in step 740 and stores the packet on the server in step 750. Next, in step 760, the server parses the packet to obtain the timestamps for sequential nodes in order to calculate the transit time between nodes in step 770. In step 780 the SLA graph points are generated from the calculations of transit time done in step 770 and the server can then create a SLA graph in step 790.

Figure 8:
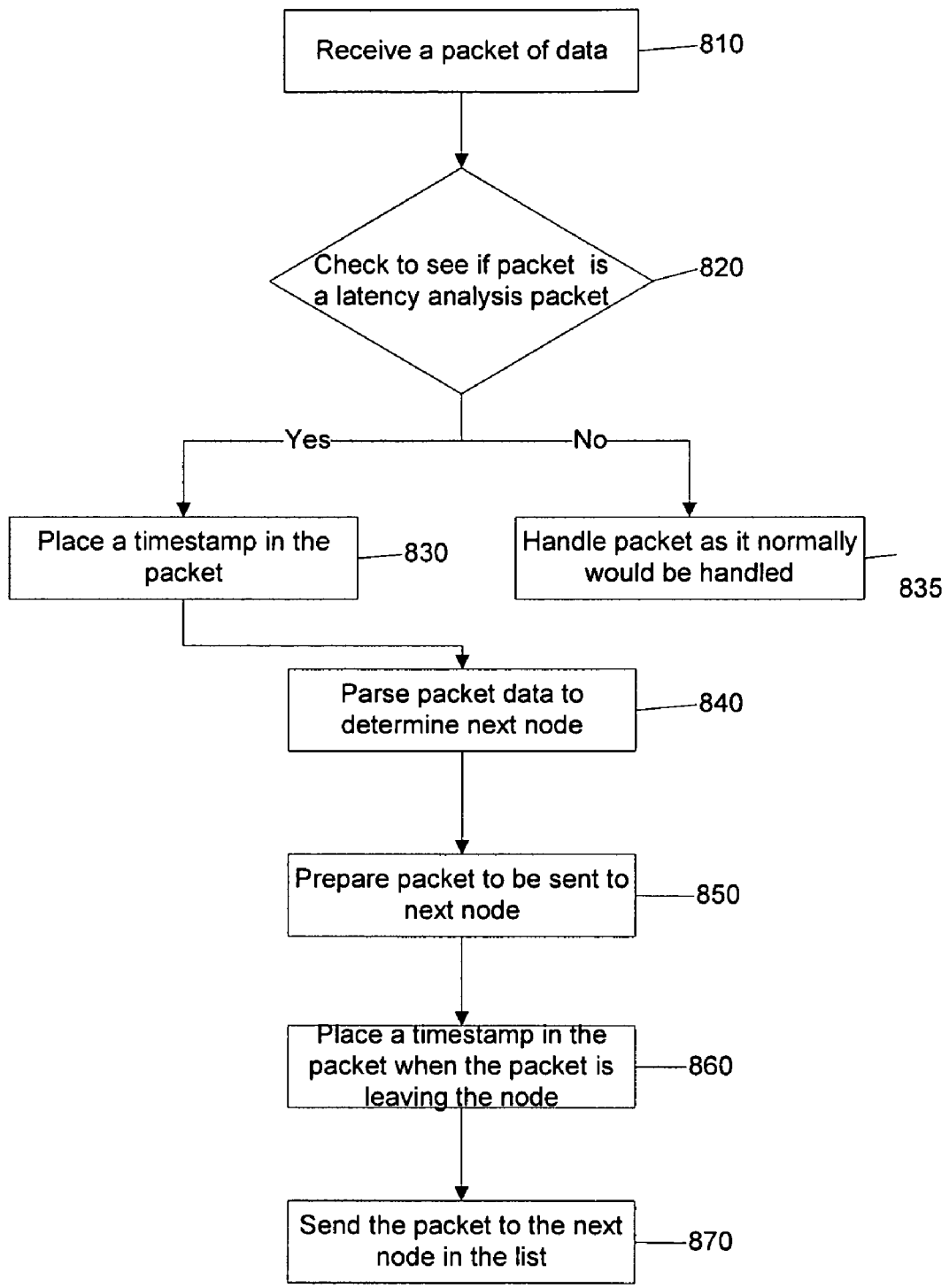
FIG. 8 is a flowchart of a process, according to at least some embodiments, performable at a node.

FIG. 8 is a flowchart showing a process that a node within a network may execute in at least one embodiment. In the embodiment shown in FIG. 8, a node receives a packet in step 810. The node then checks the packet in step 820 to determine whether the packet is a network latency analysis packet. If the node determines that the packet is not a network latency analysis packet, the node treats the packet appropriately based on the type of packet and the packet's destination in step 835. However, if the node determines that the packet is a network latency packet, the node places a timestamp in the packet correlating to the arrival time of the packet at the node in step 830. Next, in step 840, the node will parse the packet in order to determine the next node in the sequence that the packet is to be sent to and prepares the packet to be sent on to the next node in step 850. In step 860, the node may place another timestamp in the packet correlating to the departure time of the packet from the node. The node then sends the packet on to the next node in the sequence that the packet is to be sent to in step 870.

In some embodiments, there would be a recovery system in case a WAN connection or router goes down. When a WAN connection goes down, the packet will not return unless there is a parallel router or backup ISDN, thereby triggering an alarm. The IP route would then need to be adjusted so the packet can be resent. In one variation, the alarm could initiate a traceroute method to determine which router has gone down, allowing the inoperable router to be skipped.

In other embodiments, a router may have a partner router at the same site with its own WAN VPN connection or IDSN backup, in which case a field can be included in a packet to indicate that a backup route has been taken. In another variation, a field can be included for each IP route pair to indicate which initial route required a backup rout to be taken. These fields could provide additional information to understand increased delays. These fields could also act as a general indicator that there is a problem in the network.

As evident from the information provided for by embodiments of this invention, the accuracy of the measurements obtained depends upon the synchronization of the relevant routers to a common clock. In some embodiments, delay measurements are more useful when the common clocks are accurate to within approximately twenty percent of the measured delay.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described embodiments and methods that fall within the spirit and scope of the invention as set forth in the appended claims. In the claims, various portions are prefaced with letter or number references for convenience. However, use of such references does not imply a temporal relationship not otherwise required by the language of the claims.

We claim:

1. A method for processing a packet in a network at a node, the method comprising:
   receiving the packet at the node;
   parsing the packet to obtain data about the packet;
   reading a field in the packet to determine whether the packet is an administrative packet used for measuring network latency;
   marking the packet with a first timestamp;
   determining a next node for the packet to be sent to;
   sending the packet to the next node in the network;
   determining whether the packet has a multiplier associated with the node;
   determining that a next node for the packet to be sent to has been previously visited by the packet; and
   indicating that the packet has returned to the next node which has been previously visited by the packet by decrementing the multiplier associated with the node.

2. The method of claim 1, wherein reading a field in the packet to determine whether the packet is an administrative packet used for measuring network latency comprises examining a flag to determine whether the packet is the administrative packet used for measuring network latency.

3. The method of claim 1, wherein parsing the packet to obtain data about the packet comprises parsing class of service information associated with the packet.

4. The method of claim 1, further comprising marking the packet with a second timestamp to indicate when the packet is sent to the next node, wherein the packet is marked with the first timestamp when the node receives the packet.

5. The method of claim 1, wherein the next node for the packet to be sent to is listed immediately after a first identifier associated with the node.

6. The method of claim 1, wherein determining a next node for the packet to be sent to comprises:
   determining whether the packet has enough room remaining in memory of the packet to obtain a second timestamp for the next node;
   in response to determining that the packet has enough room remaining in the memory of the packet to obtain the second timestamp, determining the next node by randomly selecting another node in the network that is connected to the node; and
   in response to determining that the packet does not have enough room remaining in the memory of the packet to obtain the second timestamp, sending the packet back to a server that can process the first timestamp from the packet to determine network delay.

7. The method of claim 1, wherein the packet is received using internet protocol.

8. A method of measuring network latency, the method comprising:
   receiving the packet at a first node;
   determining whether the packet is an administrative packet used for measuring the network latency;
   marking the packet with a first timestamp when the packet is received at the first node;

determining whether the packet has enough room remaining in memory of the packet to obtain a second timestamp from a second node;

in response to determining that the packet has enough room remaining in the memory of the packet to obtain the second timestamp from the second node, sending the packet to the second node; and in response to determining that the packet does not have enough room remaining in the memory of the packet to obtain the second timestamp from the second node, sending the packet to a server for measuring the network latency.

9. The method of claim 8, wherein the second node is connected to the first node and is randomly selected by the first node.

10. The method of claim 8, wherein the packet comprises a multiplier field indicating a number of times the packet is to traverse a path between the first node and the second node, wherein the multiplier field is decremented each time the packet traverses the path.

\* \* \* \* \*